(No Model.) 2 Sheets—Sheet 1.

F. THOMAS.
VEHICLE SEAT.

No. 290,283. Patented Dec. 18, 1883.

Attest.
E. R. Hill.
J. Wm. Strahli.

Inventor.
Francis Thomas
per Wm. Hubbell Fisher,
Atty

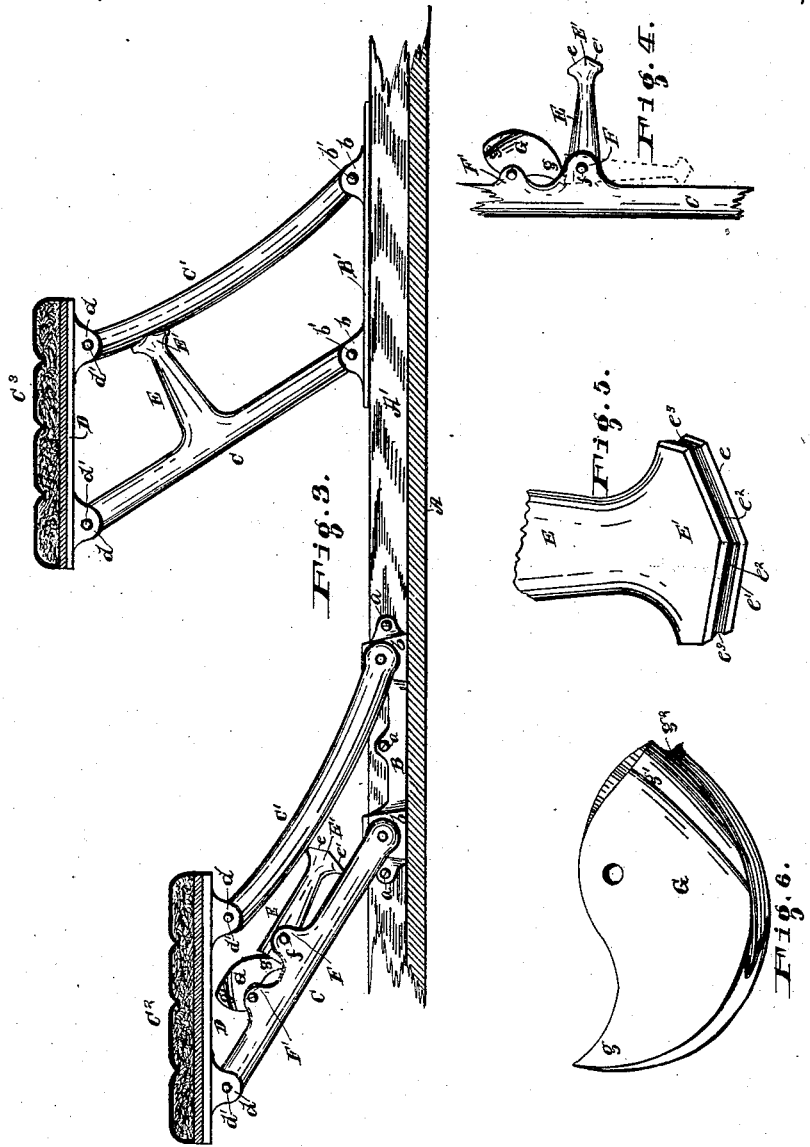

UNITED STATES PATENT OFFICE.

FRANCIS THOMAS, OF CINCINNATI, OHIO, ASSIGNOR TO DAVIS, GOULD & CO., OF SAME PLACE.

VEHICLE-SEAT.

SPECIFICATION forming part of Letters Patent No. 290,283, dated December 18, 1883.

Application filed March 1, 1883. (No model.)

*To all whom it may concern:*

Be it known that I, FRANCIS THOMAS, of Cincinnati, in the county of Hamilton and State of Ohio, have invented certain new and useful Improvements in Seats for Vehicles, of which the following is a specification.

My invention relates to that class of seats known as "jump-seats;" and its object is to provide improved mechanism by the aid of which one seat may be caused to assume a position above the other when it is desired to use but one seat, and also by which the two seats may both be supported at the same height or at different heights at will, and when so supported the seats are free from any longitudinal swaying motion.

Figure 1:
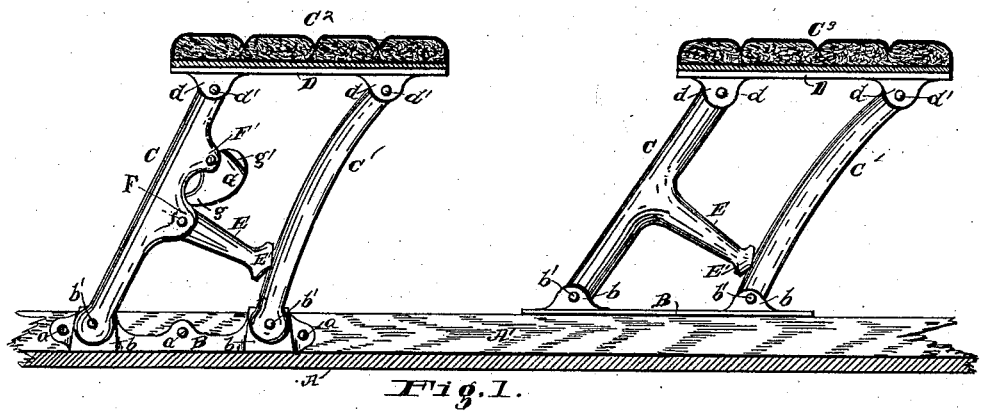
Figure 2:
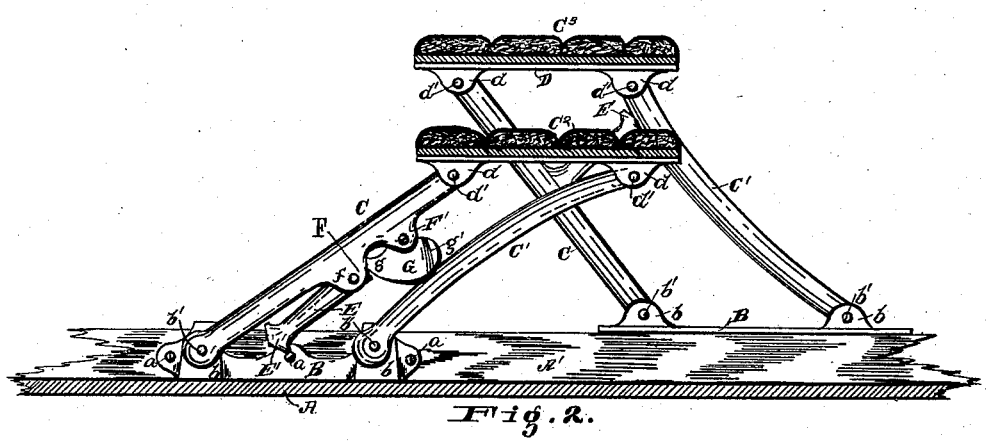

Referring to the drawings forming part of this specification, Figure 1 is a longitudinal section of a portion of the body of a vehicle, showing the legs or brackets at one end of the seats, the seats being transversely sectioned. Fig. 2 represents the position occupied by the seats when but one of them is to be used. Fig. 3 represents the position occupied by the seats when it is desired to employ both seats, one being lower than the other, as for a child's seat. Fig. 4 is a detailed view of the mechanism for adjusting the seat at the different heights. Fig. 5 is an enlarged perspective view of the free end of the stop-arm, and Fig. 6 an enlarged perspective view of the weighted pawl used in connection with said arm.

A represents the bottom of the body, and A′ the side rail of the bottom frame of the body. The plates B B′, supporting the legs C C′, are connected to the vehicle-body at any suitable point in any suitable manner. In the present instance, for the purposes of illustration, I have shown these plates secured to the side rail by means of screws or bolts, one of said plates being secured to the side of the top of same. The plate B is provided with side lugs or faces, $b$, to which lugs are pivoted the lower ends of the legs C C′, which support the seats $C^2 C^3$, the upper ends of these legs being pivoted to lugs $d$, projecting from the plates D, which are secured to the lower side of the seat, the pivotal points $d'$ being separated by a distance equal to the distance between the pivotal points $b'$ of the lower ends of the legs C C′, so that as the seat is moved one way or the other the legs will turn on the pivotal points, and the top of the seat will at all times remain on a level. The lugs $b$ of the plate B′, which is secured to the top of the rail A′, project, preferably, as shown, from the top of said plate, instead of from the side, as on the plate B. The leg C, which supports the seat $C^3$, preferably the rear one, is provided with a rigid arm, E, projecting at right angles from said leg toward the leg C′, said arm projecting preferably from the center of the leg C, as shown. The end of this arm E is provided with a head, E′, having the beveled faces $e$ $e'$, which faces are provided with the groove $e^2$, and when this arm E is pivoted, as hereinafter described, and a very low seat is to be provided for, the upper and lower edges or points of this head are each preferably provided with a notch, $e^3$. When the two seats are to be used, the rear seat, $C^3$, and its supporting legs preferably occupy the position shown in Fig. 1. The legs are inclined backward, the beveled face $e'$ of the head of the arm E resting against the lower portion of the leg C′, the arm E thus acting as a stop to prevent the seat from moving any further back, the groove $e^2$ in the face $e'$ preventing this face from slipping off from the edge of the leg C′. This seat $C^3$ may be moved forward, as shown in Fig. 3, legs C C′ turning on their pivotal points, the upper portion of the leg C′ resting on the beveled face $e$ of the head of the arm E, preventing any further forward movement of the seat. The stop-arm E of the leg C, supporting the seat $C^3$, is rigidly connected to or forms a part of said leg, as this seat is to be supported at the same height shown in Fig. 2. The other seat, $C^2$, however, is so constructed and arranged that it can be supported at different heights, and for this reason the arm E is suitably pivoted to the leg C of this latter seat. A preferred method of pivoting this arm to the leg is as follows: This leg is provided with the lugs F, between which the end of the arm E is pivoted by a bolt or rivet, $f$, the free end of this arm being capable of dropping down, as shown by dotted lines in Fig. 4.

The weighted pawl G is pivoted to the leg C above the arm E, and a preferred mode of pivoting it is as follows: Above the lugs F are the lugs F', between which is pivoted this weight-pawl G, the point $g$ of which rests against the pivoted end of the arm E, the heel $g'$ being weighted, so that the point $g$ will be kept in contact with the arm E. When the two seats are to be supported at the same height, the pivoted arm E is raised at right angles to the leg C, and the point $g$ of the pawl G, resting against the end of the arm, holds it in this position. The seat $C^2$ may now be moved backward and forward, and will be supported similarly to the seat $C^3$, the pivoted arm E being held rigidly at right angles to the leg C, in which position it serves the same purpose as the rigid arm E of the seat $C^3$. When but one seat is to be employed, the weighted heel $g'$ of the pawl G is raised, and this lifts the point $g$ of the pawl away from the end of the arm E, and the free end of the arm E thus allowed to drop, and the point $g$ of the pawl then drops down across the end of the arm and holds the latter in the position shown in Fig. 2. The seat $C^2$ is now dropped back until the edge of the pawl G rests on the leg C'. This edge of the pawl is provided with a groove or channel, $g^2$, into which the leg enters, and the pawl cannot slip off from said leg, and the seat $C^2$ is stopped in this position. The rear seat, $C^3$, is now moved forward until the head E' of the rigid arm E rests against the edge of the leg C'. The two seats are now supported in the position shown in Fig. 2, one seat being immediately under the other. When both seats are to be employed, and one of them is to be lower than the other—as for a child's seat—they occupy the position shown in Fig. 3, in which instance the seat $C^3$ is supported as heretofore described, and the seat $C^2$ is supported as follows: The pivoted arm E is dropped down against the leg C, the notch $e^3$, at the edge of the head E', which is next to the leg C, resting on and embracing the side of said leg, and the leg C' resting in the notch $e^3$ in the opposite edge of the head.

I have described the seat $C^2$ as being the front and the seat $C^3$ as being the rear seat, but, if desired, this order may be reversed. So, also, if desired, both of the arms E may be pivoted to their respective legs C, and being provided with pawls, instead of one of them being rigid, as above described.

As above described, the seats are very easily operated, and are perfectly secure in whichever position they may be placed.

The various features of my invention are preferably used together; but one or more of them may be employed separate from the remainder, and one or more of them may be used so far as applicable in connection with seats other than those particularly herein described.

Having thus described my invention, what I claim as new, and desire to secure by Letters Patent, is as follows:

1. The seat $C^2$, pivoted to the upper ends of the legs C C', the lower ends of said legs being pivoted to the plate B, secured to the body of the vehicle, in connection with the arm E, pivoted to the leg C, and the weighted pawl G, pivoted to said leg above the arm E, the point of said pawl being adapted to rest against the end of the pivoted arm E, substantially as and for the purposes specified.

2. The combination of the leg C and the arm E, pivoted at one end thereto, the other end being provided with a head, E', and the weighted pawl G, pivoted to the leg C above the arm E, and provided with a point, $g$, adapted to engage with the said arm, and a weighted heel, $g'$, to cause the point to so engage with said arm, substantially as and for the purposes specified.

3. The arm E, connected to the leg C, substantially as described, and provided with a head, E', having the beveled faces $e\ e'$, said faces being provided with the grooves $e^2$, in combination with the leg C', substantially as and for the purpose specified.

4. The arm E, pivoted to the leg C, and provided with the head E', the edges of said head being provided with the notches $e^3$, in combination with the leg C', substantially as and for the purposes specified.

5. The leg C, provided with the weighted pawl G, the edges of said pawl being provided with a groove, $g^2$, in combination with the leg C', the groove $g^2$ being adapted to engage with the edge of said leg C, substantially as and for the purpose specified.

6. In combination with the parallel pivoted legs C C', the arm E, pivoted to the leg C, and provided with head E', having the beveled faces $e\ e'$, provided with grooves $e^2$, and having edges provided with notches $e^3$, substantially as and for the purposes specified.

7. In combination with a seat having legs pivoted at one end to the seat and at the other end to the vehicle, and means for sustaining the seat at a desired elevation at a given point or points in its arc of oscillation, the oscillatory seat $C^2$ and its legs C and pivoted arm E, and pivoted pawl G, adapted to engage the adjacent leg or arm E, substantially as and for the purposes described.

FRANCIS THOMAS.

Attest:
E. R. HILL,
J. WM. STREHLI.